United States Patent Office 3,212,933
Patented Oct. 19, 1965

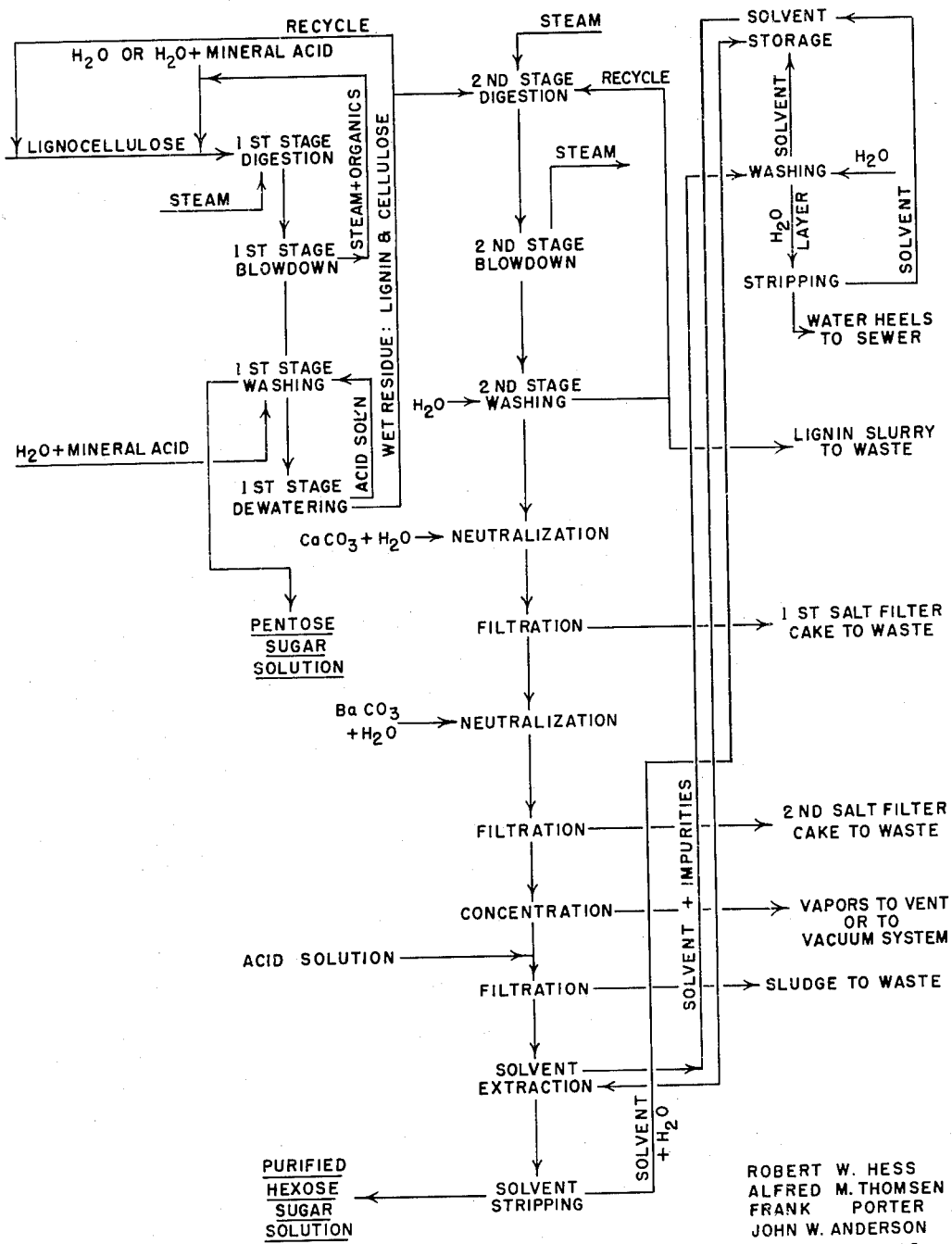

---

3,212,933
HYDROLYSIS OF LIGNOCELLULOSE MATERIALS WITH SOLVENT EXTRACTION OF THE HYDROLYSATE
Robert W. Hess, Beaverton, Oreg., Alfred M. Thomsen, San Francisco, Calif., Frank Porter, Morristown, N.J., and John W. Anderson, Portland, Oreg., assignors of one-half to Georgia-Pacific Corporation, Portland, Oreg., a corporation of Georgia, and one-half to Allied Chemical Corporation, New York, N.Y., a corporation of New York
Filed Apr. 12, 1963, Ser. No. 272,699
14 Claims. (Cl. 127—37)

This invention relates to a process for the hydrolysis of lignocellulose materials, forming water soluble sugars and leaving as a residue the lignin content of the lignocellulose.

It is well known, of course, to hydrolyze woody and other lignocellulose materials to pentose and hexose sugars which, being water soluble, are separated from the residual lignin. It also has been proposed to inoculate an aqueous solution of the sugars with yeast, converting the sugars to a protein nutrient. This nutrient, as well as the sugars themselves, forms a potential source of protein and carbohydrate feed for use in feeding livestock.

This suggested utilization of the lignocellulose-derived sugars heretofore has not been successful on a commercial basis, in part because of economic considerations, but also in large measure because of the contemporaneous production, along with the sugars, of various degradation products derived from the cellulose and lignin content of the original lignocellulose material. The identity of these degradation products is variable, depending upon the nature and duration of the hydrolytic reaction to which they owe their genesis, but in general they comprise such materials as various organic acids, furfural and other aldehydes, and various tarry materials.

The presence of such degradation products in the sugars results in at least two serious disadvantages. In the first place, if the sugars are fed directly to livestock as the carbohydrate component of a feed mixture, the degradation products render the feed unpalatable to the livestock and, if eaten, interfere with their normal metabolic processes. In the second place, if the sugars are inoculated with yeast, the degradation products interfere with the growth of the yeast, possibly by coating over the yeast cells or altering them so that their reproduction by normal budding is inhibited.

It accordingly is the general object of the present invention to provide a process for hydrolyzing lignocellulose materials in which process provision is made for removal of the cellulose- and lignin-derived degradation products.

It is another important purpose of the present invention to provide such a process for producing substantially pure sugars which are uncontaminated by hydrolysis-induced degradation products, which process may be applied without major disarrangement of the conventional lignocellulose hydrolyzing procedures, which is practical and not prohibitively expensive, and which of itself does not introduce unwanted impurities into the desired sugar products.

In accordance with the present invention, wood or other lignocellulose is subjected to acid hydrolysis under conditions of elevated presure and temperature calculated to reduce the hemicellulose and cellulose content of the lignocellulose to pentose and hexose sugars. The hydrolytic reaction may be carried out in single or multiple stages as desired. In either case, at the termination of a selected stage, or at the conclusion of the reaction, the liquor fraction containing the sugars is extracted with a solvent which removes selectively the undesired degradation products.

Preferably, the liquor, which originally has a pH of from 1–2, is neutralized to a pH value of 3–4 preliminary to the solvent extraction. This converts the mineral acid content of the liquor to the corresponding acid salts, leaving any organic acids which may be present as the free acids, which then are removed selectively in the solvent phase.

The solvent phase then may be separated from the liquor phase and the latter stripped with steam to remove any residual solvent. As a consequence, there is formed an aqueous solution of sugars, free from hydrolytic degradation products of lignocellulose, which is well suited for use as stock feed, as a yeast growing medium, or as a commercial source of lignocellulose-derived sugars.

The lignocellulose materials which may be employed in the process of the present invention broadly comprise those classes of lignocellulose materials which stem from plant growth processes and are readily available as waste by-products of various industries. Thus they may comprise such plant-derived materials as oat hulls, cornstalks, and bagasse. In particular, however, they comprise the woods of various species of trees.

The selected lignocellulose material requires no special treatment preliminary to its use although it should be reduced to a finely divided state if it already is not present in that condition. Thus wood may be employed to advantage in the form of sawdust, wood shavings, chips, flakes and the like.

Although the process of the invention may be applied to the plural stage hydrolysis of lignocellulose materials, and is described herein with particular reference thereto, it also in its broadest aspect is applicable to situations in which a single stage hydrolysis of such materials is contemplated.

A. SINGLE STAGE HYDROLYSIS

(1) *Hydrolysis*

In this concept of the invention, the lignocellulose material is treated with an aqueous treating agent which may contain a mineral acid such as sulfuric, hydrochloric or phosphoric acid, using a treating agent to lignocellulose solids weight ratio in the range of from 1:1–5:1. The treating agent may have a mineral acid concentration of not over 3.0% by weight.

The hydrolysis is carried on under a pressure of from 100–900 p.s.i.g. and corresponding temperatures for saturated steam. It is continued for a time which varies with the temperature, the shorter times being applicable to the higher temperatures, and vice versa. During this time the hemicellulose and cellulose content of the lignocellulose material is converted to pentose and hexose sugars which are dissolved in the aqueous liquid present.

As a result of the foregoing there is formed a liquor containing the sugars and a solid residue comprising predominantly unhydrolyzed lignin. These two products are separated and the sugar-containing liquor extracted with solvent for removal of impurities.

(2) *Solvent extraction*

As a first step in the solvent extraction it is desirable to neutralize partially the liquor, which has an original pH of from 1–2. This step has for its function the selective conversion of any inorganic acids to the corresponding salts, while leaving in solution any free organic acids which may be present. The free organic acids then will be removed together with the non-acid organic impurities, during the solvent extraction step.

Hence the liquor is treated with caustic soda, soda ash, or other suitable basic material until a pH of 3–4 has been obtained. It then may be evaporated, preferably in vacuo, until its sugar concentration has reached a value of 15 to 25% by weight.

In the alternative, and preferably, the liquor may be neutralized with a basic material which will form an insoluble precipitate with the inorganic acid present in the liquor. For example, when the acid is sulfuric acid, calcium or barium oxide, hydroxide or carbonate may be used as the neutralizing agent. The resulting insoluble salt, e.g. calcium or barium sulfate, then may be separated by filtration and the resulting salt-free liquor evaporated to the desired concentration.

The partially neutralized and evaporated liquor is transferred to conventional extraction apparatus where it is contacted countercurrently in continuous flow, or batchwise, with a solvent having properties calculated to dissolve selectively the organic impurities, without dissolving the sugars, and without reacting with them. In addition, the solvent should be substantially water insoluble and chemically inert.

Classes of solvents which are suitable for the indicated purpose accordingly are the lower aliphatic ethers, chlorinated hydrocarbons and ketones, i.e. those aliphatic ethers, chlorinated hydrocarbons and ketones containing not more than 8 carbon atoms.

Illustrative of suitable lower alpihatic ethers are diethyl ether, methylpropyl ether, and di-isoproply ether.

Illustrative of suitable lower aliphatic chlorinated hydrocarbons are methylene chloride, chloroform, carbon tetrachloride and trichloroethylene.

Illustrative of suitable lower aliphatic ketones are methylethyl ketone and methyl isobutyl ketone.

Contacting the liquor with the organic solvent results in the production of a two-phase system comprised of an aqueous phase containing the desired sugars and an organic solvent phase containing the organic solvent and impurities. These two phases are separated.

The aqueous phase, which contains the desired sugars is stripped with steam, or otherwise treated, to remove any residual solvent which may be in it. This removes from the sugars the materials which might affect adversely their subsequent application. It also results in the recovery of an additional quantity of solvent which may be cycled to solvent storage and reused in the treatment of a further quantity of liquor.

The organic liquid phase may be washed with water to remove the extracted impurities after which the water phase is stripped for removal of any residual solvent, the recovered solvent being passed to storage for reuse.

If desired, the sugar solution may be treated with a further quantity of basic acting materials such as caustic soda, or soda ash, until its pH has been raised to a value of 6–7. It then may be evaporated further, stored or applied to such uses as growing yeast or feeding livestock.

B. TWO STAGE HYDROLYSIS

(1) First stage hydrolysis

Where the presently described solvent extraction procedure is to be included in a stepwise hydrolysis of the lignocellulose material, in the manner outlined in the flow plan, the material may be heated in a first stage with a first aqueous liquor of such a nature, and under such conditions, as to hydrolyze selectively the hemicellulose content of the lignocellulose forming a sugar product containing a substantial proportion of pentose sugars.

In the execution of the first stage treatment it is not necessary to pretreat the lignocellulose material, as by adjusting its moisture content, or pre-soaking it with preliminary reagents. However, it is very desirable to premix the lignocellulose intimately with the selected aqueous liquor before subjecting the lignocellulose to elevated temperatures and pressures. This is especially desirable since in the first stage the liquor to solids ratio is maintained at a relatively low level.

Accordingly the lignocellulose material and treating liquor are premixed in a suitable apparatus such as a double ribbon blender, a pug mill, a rotary drum mixer, or like apparatus. The mixing is continued until the treating liquor has been distributed uniformly throughout the charge, thereby avoiding both starved regions and regions where there is a surplus of treating agent.

This, in turn, insures that during the hydrolytic treatment there will not be areas where some of the lignocellulose material is not acted upon, nor will there be treating areas wherein a surplus of treating agent induces undesired conversion of the cellulose, and degradation of the lignin. It has been found, in fact, that, by premixing thoroughly, a uniformity of reaction occurs throughout the entire reaction mixture which results in improving materially the conversion of hemicellulose to sugars.

The amount and character of treating agents to be premixed with the lignocellulosic material is such as to be consonant with the primary objective of the process, i.e. that of selectively converting in the first stage treatment the hemicelluloses to pentose and other derivative sugars. Hence the concentration of mineral acid included in the treating agent is kept at a very low level, i.e. not over 0.3% by weight. It usually is preferred to carry out the treatment in the substantial absence of added mineral acid, relying upon the inherently acid pH of the lignocellulosic reaction mixture to break down the hemicellulose in the desired manner.

Likewise, the liquor to solids charging ratio is maintained at a very low level, i.e. a level of from 1:1–5:1, preferably from 1:1–3:1. In the conventional wood hydrolysis procedures, a liquor to solids ratio of the order of 6:1 has been employed.

Various factors may be controlled in order to arrive at the desired liquor to solids weight ratio. This is possible since the water component of the liquor is derived in part from each of three sources.

First, the inherent moisture content of the lignocellulosic material contributes a certain proportion of water. Next, the water added in the premix stage contributes a further proportion. Finally, where the reaction mixture is heated by direct steam injection, the condensed steam contributes a still further proportion. Hence control of the amount of water furnished by each of these three sources makes it possible to regulate accurately the final liquor to solids ratio of the mixture.

In the preferred practice of the invention, the amount of water used in premixing may be relatively small, for example, sufficient only to provide a liquid to solids charging ratio of 1.5:1. However, sufficient water then is added during heating by steam injection to increase the amount of water present until a final liquid-solids ratio of from 4–5:1 is attained.

Where a mineral acid is included in the aqueous treating liquor, it may comprise any of the common mineral acids which do not react with lignocellulosic materials to cause the occurrence of undesirable side reactions. Illustrative of such acids are hydrochloric acid, phosphoric acid, and particularly, sulfuric acid. Acid-acting salts such as monosodium phosphate and sodium acid sulfate also may be used to provide all or part of the acid content of the liquor.

The premixed lignocellulose and aqueous liquor then are introduced into a suitable pressure vessel. This may be either a continuous or batch pressure reactor provided with means for heating the charge to the predetermined temperature and pressure. As stated before, this may be accomplished by direct steam injection.

Within the reactor the pressure upon the charge is increased as rapidly as possible to a value of from 100–700 p.s.i.g., preferably from 250–600 p.s.i.g., the temperature being increased contemporaneously to the corresponding levels for saturated steam. These conditions are maintained for a relatively brief period of time, sufficient only to convert substantially selectively the hemicellulose content of the lignocellulose to pentose and hexose sugars. In the average case this requires but from 0.3–10 minutes. The time is in substantially inverse relation to the temperature applied, i.e. the higher the temperature, the shorter the time, and vice versa.

As a result, there is formed a first liquor product containing pentose and hexose sugars together with a small amount of volatile organic acids such as acetic acid, as well as the residual mineral acid if a mineral acid is included in the first instance. There also is formed a first solid residue containing predominantly unhydrolyzed lignin and unhydrolyzed cellulose.

The pressure next is reduced preliminary to separation of the liquor and solid residue products. Whereas the time required for pressure reduction by prior art procedures has been very long, i.e. of the order of seveal hours, it is important for the success of the presently described process that it be kept at a very low value. Thus there is a substantially instantaneous reduction of pressure resulting in what is termed herein as a "flash blowdown." Where a continuous reactor is employed, the blowdown time is but a few seconds. Where a large batch reactor is used, the blowdown time is but a few minutes.

Such a rapid reduction in pressure has several significant effects.

First, it rapidly stops the hydrolytic reaction. This in turn minimizes the production of hexose sugars from degradation of the cellulose. It also minimizes production of lignin degradation products and prevents the decomposition of the desired sugar products.

Secondly, the flash blowdown evaporates some of the water which is present. The resultant steam then may be employed to advantage in a heat exchange with the material charged to the reactor.

Third, the flash blowdown flashes off acetic acid, formic acid, or other organic volatiles which may have been formed as by-products of the reaction. There thus is provided a built in operation for separating and removing impurities from the reaction products.

Fourth, the flash blowdown explodes the particles of the solid residue. This makes them porous, opening them up for more efficient treatment in the second hydrolytic stage.

The flash blowdown may be carried out in any suitable apparatus. In a continuous process, it may be carried out to advantage by continuously passing the charge from the reactor into a cyclone separator, specially designed to handle large volumes of material, and resistant to corrosion and abrasion.

As indicated in the flow plan, the volatile fraction resulting from the blowdown step, comprising steam and volatile organics, may be exhausted through a suitable heat exchange system. In the alternative, it may be condensed, and recycled to the treatment of additional quantities of lignocellulose with or without the preliminary separation of its organic content.

The residue remaining from the blowdown contains water-insoluble lignin, and cellulose. In addition, it contains water-soluble pentose and hexose sugars which it is desired to remove.

Accordingly the residue is passed through a suitable washer and treated with a selected liquid. This advantageously may be an aqueous solution of mineral acid, for example, a .5% solution of sulfuric acid. The separation is carried out preferably by continuous displacement washing of counter-current streams in a tower. In the tower, the solids settle downwardly, becoming saturated with acid, while the liquor rises upwardly, displacing the sugar solution. By the application of this technique the sugar solution is withdrawn in a relatively high concentration of the order of 5–12% by weight.

The pentose sugar liquor thus obtained represents one of the final products. It may be stored, or applied to its various uses. For example, it may be neutralized to a pH of 4–5 with calcium carbonate, ammonia or other basic material and thereafter inoculated with yeast in the production of a protein stock feed.

(2) *First stage solvent extraction*

As set forth above, however, this liquor contains a substantial but varying amount of degradation products, the amount and nature of which depend upon the identity of the starting material and the severity of the reaction conditions. In general, these reaction products comprise various organic acids such as formic acid, and acetic acid; lower aliphatic alcohols, especially methyl alcohol; various aldehydes such as acetaldehyde, furfural and furfural derivatives; and levulinic acid and levulinic acid derivatives. Various tarry materials also may be present.

These impurities adversely affect the application of the liquor to some uses, for example, its use as a yeast growth medium as has been explained above. Accordingly at this stage of the process the liquor may be subjected to the above described solvent extraction procedure for selective removal of these degradation products. The result is the production of a useful pentose product having a high degree of purity.

(3) *Second stage hydrolysis*

The solid residue resulting from the first stage treatment is returned to the same or a separate reactor, adding more mineral acid if that remaining in it from the above described washing procedure is not sufficient for the second stage treatment.

The reaction conditions in the second stage reactor are more strenuous than those prevailing in the first stage reactor. They have as their object the conversion of the cellulose to hexose sugars without inducing undue degradation of the lignin.

Accordingly the liquor to solids ratio is maintained within the broad range of from 1:1–5:1, preferably from 1:1–3:1. The mineral acid concentration of the liquor treating agent is maintained at a level of from 0.3–3.0% by weight.

The reactor is heated indirectly, or preferably by the direct injection of steam, until a pressure of 150 to 900 p.s.i.g., preferably from 400–800 p.s.i.g. and corresponding temperatures for saturated steam, are reached.

The reactor is maintained under the foregoing conditions for a time which is in substantially inverse relation to the temperature, i.e. the higher the temperature the shorter the time and vice versa. During this time, which is within the range of from 0.3 to 10 minutes, the cellulose content of the charge is converted substantially selectively to hexose sugars, leaving a solid residue containing predominantly unhydrolyzed lignin.

As in the first stage it is highly desirable to terminate the reaction abruptly in order to minimize production of undesired degradation products, in order to evaporate excess water, in order to flash off any organic volatiles which may be present, and in order to modify the lignin residue so that it may be filtered and handled more easily.

For these reasons the charge of the reactor is subjected to a flash blowdown, as by passing it continuously to a blowdown cyclone apparatus. This reduces the pressure to atmospheric pressure in a matter of but a few seconds.

The steam from the blowdown apparatus is vented while the solid product is washed with water in a second stage washer. The operation of this washer results in separating the hexose sugar liquor from the cellulose-containing lignin residue, which is passed to waste or recycled.

Thereafter the liquor is treated with a neutralizing agent such as calcium carbonate and any appropriate filter aid, more water is added if necessary, and the mixture filtered.

The resulting salt filter cake is discarded and the liquor subjected again, if necessary, to treatment with a neutralizing agent such as barium carbonate used with a suitable filter aid. It is filtered again and the second salt filter cake discarded. If desired the liquor may be vacuum concentrated.

(4) Second stage solvent extraction

As in the case of the pentose sugar liquor obtained as a product of the first stage hydrolysis, the hexose sugar liquor resulting from the foregoing sequence contains a variable amount of impurities derived from degradation of the cellulose and lignin. Such impurities comprise the organic acids, alcohols, aldehydes and tarry materials set forth above. Since their removal is desirable if the sugars are to be applied with maximum success to certain of their industrial applications, the hexose sugar liquor is solvent extracted in the manner heretofore described. This yields as a product a solution containing predominantly pure glucose.

The process of the invention is illustrated in the following examples:

EXAMPLE 1

This example illustrates the application of the process of the invention to a single stage hydrolysis of lignocellulose materials.

1000 parts by weight of Douglas fir sawmill waste including largely sawdust and shavings was mixed in a double ribbon blender with 2000 parts of dilute sulfuric acid solution having a concentration of 0.4%.

The resulting mixture was passed into a continuous pressure reactor at an initial liquor to solids ratio of 2.5 to 1.

In the reactor the mixture was subjected to a pressure of 400 p.s.i.g. and a temperature of 230° C. for a dwell time of 1.5 minutes. During the reaction the pressure and temperature were attained and maintained by direct injection of steam. This resulted in increase of the liquor to solids ratio to a level of 5 to 1.

The material was transferred to a blowdown cyclone separator which lowered the pressure to atmospheric pressure in 1 minute. The steam fraction was treated for removal of acetic acid and other volatile organics after which the liquid was recycled to the reactor.

The solid residue consisting of unhydrolyzed lignin, cellulose, and absorbed sugars was transferred to a washer where it was passed countercurrent to a dilute sulfuric acid solution containing 0.5% by weight of sulfuric acid. This resulted in the displacement washing of the solids, leading to the separation of an aqueous sugar solution which was processed for removal of its impurities.

The sugar solution was passed countercurrent continuously to a quantity of isopropyl ether in a continuous solvent extractor. The solvent phase containing the impurities was washed with water, returned to storage and recycled. The wash water was stripped with steam to remove solvent, which also was recycled.

The aqueous phase containing the sugars was stripped with steam, the strippings being processed for the recovery of the solvent.

This left 3510 parts of a sugar solution containing 10% of sugars.

EXAMPLE 2

This example illustrates the application of the invention to the two-stage hydrolysis of lignocellulose material.

1000 parts by weight of Douglas fir sawmill waste including largely sawdust and shavings was mixed in a double ribbon blender with 2000 parts of dilute sulfuric acid solution having a concentration of 0.1%.

The resulting mixture was passed into a continuous pressure reactor at an initial liquor to solids ratio of 1.6 to 1.

In the reactor the mixture was subjected to a pressure of 294 p.s.i.g. and a temperature of 215° C. for a dwell time of 5 minutes. During the reaction the pressure and temperature were attained and maintained by direct injection of steam. This resulted in increase of the liquor to solids ratio to a level of 3.9 to 1.

The material was transferred to a blowdown cyclone separator which lowered the pressure to atmospheric pressure in 1 minute. The steam fraction was treated for removal of acetic acid and other volatile organics after which the liquid was recycled to the reactor.

The solid residue consisting of unhydrolyzed lignin, cellulose and absorbed pentose sugars was transferred to a washer where it was passed countercurrent to a dilute sulfuric acid solution containing 0.5% by weight of sulfuric acid. This resulted in the displacement washing of the solids, leading to the separation of an aqueous pentose-hexose sugar solution.

The solid fraction from the first stage extractor was dewatered and transferred to a second stage digester. Its initial liquor to solids ratio was 1.6 to 1. The mineral acid concentration was 0.79% by weight.

The pressure and temperature within the reactor were raised to 590 p.s.i.g. and 252° C. respectively, by the direct injection of steam. This resulted in alternation of the liquor to solids ratio to a value of from 7.5 to 1.

The contents of the reactor were held at temperature and pressure for 1 minute. Thereafter they were transferred to a flash blowdown cyclone separator.

The steam from the separator was vented. The solid residue was passed to a countercurrent second stage washer where it was washed with water. The lignin slurry (600 parts) resulting from the washing was passed to waste.

12 parts of calcium carbonate were added together with 0.5 parts of diatomaceous earth filter aid to the hexose sugar-containing solution. The resulting mixture was filtered and the resulting sulfate filter cake discarded.

The filtrate then was treated with 9 parts of barium carbonate and 0.5 part of filter aid. This mixture was filtered and the resulting sulfate filter cake thereafter discarded.

The filtrate was evaporated to a concentration of 17% in a vacuum evaporator. The concentrated hexose solution then was solvent extracted with chloroform, using the extracting procedure described in Example 1.

The resulting solvent extracted sugar solution contained 17% of hexoses, principally glucose.

Having thus described the invention in preferred embodiments, what is claimed as new and desired to protect by Letters Patent is:

1. A process for the hydrolysis of lignocellulose material which comprises:
   (a) heating the lignocellulose material in a first stage with a first aqueous treating agent,
   (b) using a treating agent to solids weight ratio within the range of from 1:1–5:1,
   (c) the treating agent having a mineral acid concentration of not over 0.3% by weight,
   (d) at a pressure of from 100–700 p.s.i.g. and corresponding temperatures for saturated steam,
   (e) for a time of from 0.3 to 10 minutes used in substantially inverse relation to the temperature, thereby hydrolyzing substantially selectively the hemicellulose content of the lignocellulose material and forming a first liquor product containing pentose sugars and a first solid residue containing predominantly unhydrolyzed lignin and cellulose,
   (f) separating the first liquor product from the first solid residue,
   (g) heating the first solid residue in a second stage with an aqueous mineral acid treating agent,
   (h) using a treating agent to solids ratio within the range of from 1:1–5:1,
   (i) the treating agent having a mineral acid concentration of from 0.3–3.0% by weight,
   (j) at a pressure of from 150–900 p.s.i.g. and corresponding temperatures for a saturated steam,
   (k) for a time of from 0.3 to 10 minutes used in substantially inverse relation to the temperature, thereby converting substantially selectively the cellulose content of the first solid residue to hexose sugars and forming a second solid residue containing predominantly unhydrolyzed lignin and a second liquor product containing predominantly hexose sugars contaminated with hydrolytic degradation products of the lignin and cellulose, (l) separating the second liquor product from the second solid residue, (m) extracting the second liquor product with an organic solvent which is substantially insoluble in and chemically inert toward the liquor, and in which the said hydrolytic degradation products selectively are soluble, (n) and separating the extracted second liquor product from the organic solvent.

2. The process of claim 1 wherein the organic solvent comprises at least one member of the group of organic solvents consisting of the lower aliphatic ethers, chlorinated hydrocarbons and ketones.

3. The process of claim 1 wherein the organic solvent comprises a lower aliphatic ether.

4. The process of claim 1 wherein the organic solvent comprises di-isopropyl ether.

5. The process of claim 1 wherein the organic solvent comprises a chlorinated hydrocarbon.

6. The process of claim 1 wherein the organic solvent comprises trichloroethylene.

7. The process of claim 1 wherein the organic solvent comprises chloroform.

8. The process of claim 1 wherein the organic solvent comprises a lower aliphatic ketone.

9. The process of claim 1 wherein the organic solvent comprises methyl ethyl ketone.

10. The process of claim 1 including the step of neutralizing the liquor product to a pH of from 3–4 preliminary to extraction of the liquor product with an organic solvent.

11. The process of claim 1 wherein the treating agent to solids ratio in both stages is 1:1–3:1.

12. The process of claim 1 wherein the pressure in the first stage is from 250–600 p.s.i.g. and the second stage from 400–800 p.s.i.g.

13. The process of claim 1 including the step of washing the first solid residue with dilute aqueous mineral acid, thereby contemporaneously removing the pentose sugars therefrom and impregnating it with acid requisite for the heating of the residue in the second stage.

14. A process for the hydrolysis of wood which comprises:

(a) heating the wood in a first stage with a first aqueous treating agent, (b) using a treating agent to solids weight ratio within the range of from 1:1–3:1, (c) the treating agent having a mineral acid concentration of not over 0.3% by weight, (d) at a pressure of from 250–600 p.s.i.g. and corresponding temperatures for saturated steam, (e) for a time of from 0.3 to 10 minutes used in substantially inverse relation to the temperature, thereby hydrolyzing substantially selectively the hemicellulose content of the wood and forming a first liquor product containing pentose sugars and a first solid residue containing predominantly unhydrolyzed lignin and cellulose, (f) separating the first liquor product from the first solid residue, (g) heating the first solid residue in a second stage with an aqueous mineral acid treating agent, (h) using a treating agent to solids ratio within the range of from 1:1–3:1, (i) the treating agent having a mineral acid concentration of from 0.3–3.0% by weight, (j) at a pressure of from 400–800 p.s.i.g. and corresponding temperatures for saturated steam, (k) for a time of from 0.3 to 10 minutes, used in substantially inverse relation to the temperature, thereby converting substantially selectively the cellulose content of the first solid residue to hexose sugars and forming a second solid residue containing predominantly unhydrolyzed lignin and a second liquor product containing predominantly hexose sugars contaminated with hydrolytic degradation products of the lignin and cellulose, (l) separating the second liquor product from the second solid residue, (m) extracting the second liquor product with an organic solvent comprising at least one member of the group consisting of the lower aliphatic ethers, chlorinated hydrocarbons and ketones, (n) and separating the extracted second liquor product from the organic solvent.

References Cited by the Examiner

UNITED STATES PATENTS

| | | | |
|---|---|---|---|
| 2,356,500 | 8/44 | Boinot | 127—37 |
| 2,431,163 | 11/47 | Boehm et al. | 127—37 X |
| 2,516,833 | 8/50 | Ant-Wuorinen | 127—37 |
| 2,734,836 | 2/56 | Elian et al. | 127—37 |
| 2,801,939 | 8/57 | Hignett et al. | 127—37 |

OTHER REFERENCES

Plow et al.: The Rotary Digester in Wood Saccharification, Ind. and Chem., vol. 37, January 1945, pp. 36–43.

Saeman: Kinetics of Wood Saccharification, Ind. and Eng. Chem., vol. 37, January 1945, pp. 43–52.

Perry: Chemical Engineers' Handbook, third ed., 1950, McGraw-Hill, New York, pp. 277–278.

MORRIS O. WOLK, *Primary Examiner*.